United States Patent
Speranza et al.

(10) Patent No.: US 11,148,905 B1
(45) Date of Patent: Oct. 19, 2021

(54) HANDSFREE ELEVATOR CONTROL SYSTEM

(71) Applicant: Nouveau National LLC, Long Island City, NY (US)

(72) Inventors: Dean Speranza, Long Island City, NY (US); Da Wang, Long Island City, NY (US); Jamie Wekerle, Long Island City, NY (US); Sean Zeoli, Long Island City, NY (US)

(73) Assignee: Nouveau National LLC, Long Island City, NY (US)

( * ) Notice: Subject to any disclaimer, the term of this patent is extended or adjusted under 35 U.S.C. 154(b) by 0 days.

(21) Appl. No.: 17/248,819

(22) Filed: Feb. 9, 2021

Related U.S. Application Data

(60) Provisional application No. 63/198,662, filed on Nov. 2, 2020, provisional application No. 62/704,946, filed on Jun. 30, 2020.

(51) Int. Cl.
  *B66B 1/52* (2006.01)
  *B66B 3/00* (2006.01)
  *G06F 3/038* (2013.01)
  *G06F 3/03* (2006.01)

(52) U.S. Cl.
  CPC .............. *B66B 1/52* (2013.01); *B66B 3/002* (2013.01); *G06F 3/038* (2013.01); *G06F 3/0325* (2013.01); *B66B 2201/4623* (2013.01); *B66B 2201/4638* (2013.01)

(58) Field of Classification Search
  CPC .... H04B 1/38; H04B 10/1143; H04B 10/502; H04B 5/0025; H04B 10/80; H04B 10/50; B66B 3/002; B66B 1/3415; B66B 1/468; B66B 2201/4638; B66B 11/0226; B66B 1/463; B66B 1/34; B66B 11/0233; B66B 13/14; B66B 1/3492; B66B 2201/405; B66B 1/14; B66B 1/50; B66B 1/52; B66B 2201/101; B66B 2201/102; G02B 6/356; G08B 29/04; H01H 19/025; H01H 19/585; H01H 2239/006; H01H 2225/03; H01H 23/025
  See application file for complete search history.

(56) References Cited

U.S. PATENT DOCUMENTS

| | | | |
|---|---|---|---|
| 9,035,917 B2 | 5/2015 | Jansson et al. | |
| 9,164,625 B2* | 10/2015 | Holmgren | G06F 3/0428 |
| 9,262,074 B2 | 2/2016 | Eriksson et al. | |
| 10,968,073 B1* | 4/2021 | Alnajjar | B66B 1/3469 |
| 2006/0011419 A1* | 1/2006 | Chuang | B66B 1/461 187/316 |
| 2015/0232300 A1* | 8/2015 | Preston | B66B 1/461 187/395 |
| 2016/0103500 A1* | 4/2016 | Hussey | B25J 13/084 345/173 |
| 2018/0273345 A1* | 9/2018 | Rao | B66B 3/008 |

* cited by examiner

*Primary Examiner* — Marlon T Fletcher
(74) *Attorney, Agent, or Firm* — MG Miller Intellectual Property Law LLC

(57) ABSTRACT

A touchless elevator call button selection device utilizing a plurality of infrared beams is disclosed along with its method of use. By using beams of light to detect the placement of a user's fingers, the touchless elevator call button selection device allows the user to interface with the elevator control system without physically touching the elevator control system.

13 Claims, 4 Drawing Sheets

HANDSFREE ELEVATOR CONTROL SYSTEM

CLAIM OF PRIORITY

This application claims priority to U.S. Provisional Patent Application No. 62/704,946 filed on Jun. 3, 2020 entitled "HANDSFREE ELEVATOR CONTROL SYSTEM" as well as priority to U.S. Provisional Patent Application No. 63/198,662 filed on Nov. 2, 2020 entitled "HANDSFREE ELEVATOR CONTROL SYSTEM", the contents of both of which are hereby incorporated by reference in their entirety.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The present disclosure relates generally to a handsfree elevator control system. More particularly, the present disclosure relates to a handsfree elevator control system that uses beams of light to allow the user to interface with the elevator control system without physically touching said elevator control system.

BACKGROUND

Traditional elevator call button selection is performed when a user selects their desired floor by physically pressing an elevator call button. The elevator system knows which floor to send the elevator because there is electronic coupling of the physical elevator call buttons to the elevator control system. The elevator control system will then transport the elevator cab to the desired floor.

The requirement of physical button selection introduces an issue: an increased likelihood of viral and bacterial transmission spread between users of the elevator. Although, the traditional physical elevator call button interface has always been a source of viral and bacterial transmission, this issue has been brought to the forefront of the public mind due to the COVID-19 Pandemic. Research published in the New England Journal of Medicine shows that the SARS-CoV-2 virus, the virus responsible for COVID-19, can remain active on stainless steel and plastic (materials frequently used on elevator call buttons) surfaces for two to three days.

Surface transmission is especially concerning when coupled with the fact that a 2015 study by Yen Lee Angela Kwok, Jan Gralton, and Mary-Louise McLaws, found medical students (a class of individuals far more informed about the science of viral transmission) to touch their face an average of 23 times per hour. Put simply, the physical button selection in a traditional elevator cab puts all current riders and future riders at an increased risk of viral and/or bacterial transmission.

A solution to the issue of multiple elevator riders touching the physical elevator call buttons would be to have a dedicated elevator operator, where the riders would vocally relay their request to the operator. However, by stationing an elevator operator within the elevator cab there is in an increased risk of droplet or aerosol viral transmission to the operator and subsequently to future riders, preventing any reduction in the transfer of any virus and/or bacteria.

Another solution to the issue of viral and/or bacterial transmission via a physical elevator call button is to increase the frequency in which the buttons are sanitized. However, unless the control panel is sanitized after each contact with the buttons, there is still a likelihood of transmission. Furthermore, both the expense of sanitizing chemicals and labor can be cost prohibitive, in addition to the physical damage that the repeated use of oxidizing agents can have on the elevator and its respective control system. This is especially problematic in times, such as the COVID-19 pandemic, where cleaning supplies are in short supply.

While these units may be suitable for the particular purpose employed, or for general use, they would not be as suitable for the purposes of the present disclosure as disclosed hereafter.

In the present disclosure, where a document, act, or item of knowledge is referred to or discussed, this reference or discussion is not an admission that the document, act, item of knowledge, or any combination thereof that was known at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed. It is contemplated that the claims may encompass one or more of the conventional technical aspects discussed herein.

SUMMARY

The present disclosure provides for a touchless elevator interface device, for use with an elevator call button system, the elevator call button system having a plurality of call buttons. In a highly preferred embodiment, the touchless elevator interface device includes a sensor module equipped with a plurality of sensors and at least one application-specific integrated circuit chip, each sensor having an emitter configured to outwardly emit at least one infrared beam and a receiver. The plurality of sensors are proximate to at least one of the other plurality of sensors, where the plurality of sensors are disposed in the sensor module in a linear manner creating a line in a first direction, the variable indexing point is determined by an interruption in any of the at least one infrared beams, the at least one infrared beam of each emitter is outwardly emitted in a second direction, the first direction and the second direction are non-parallel, and where the plurality of sensors are in electronic communication.

The touchless elevator interface device in accordance with the present disclosure also includes a sensor control system comprising a power supply and a control board, the control board having a first memory and a first processor, where the first memory is configured to receive and store an electronic list of the plurality of calls buttons, a location of each of the plurality of call buttons in relation to other of the plurality of call buttons, and where the first memory contains computer-readable instructions for implementing a mapping scheme correlating each of the plurality of call buttons to a variable indexing point of one of the plurality of sensors, and computer-readable instructions containing an indexing point reference table having a means for correlating a given variable index point with the mapping scheme. The first processor is configured to execute the contents of the first memory. In a preferred embodiment, the device also includes a relay board having a plurality of relays, a second memory, and a second processor, where each of the plurality of relays is configured to correspond to one of the plurality of call buttons and is configured to electronically activate said corresponding call button, where the second processor is configured to execute the contents of the second memory, where the relay board, sensor control system, the sensor module, and the elevator call button system are all in electronic communication therewith. Finally, in many embodiments, the device in accordance with the present disclosure includes a sensor housing which envelopes the sensor module, where the sensor control system and the relay board are external to the sensor module.

Note that in a preferred embodiment the sensor housing comprises a first portion having a first top side, first bottom side, a first left side, a first right side, a first front face, a first rear face, where the first rear face is fitted with a fastening mechanism, where the first portion is fastened to the elevator call button system by the fastening mechanism, and a second portion having a second top side, a second bottom side, a second left side, a second right side, a second front face, a second rear face, where the second rear face is attached to the first front face, and where the first portion and the second portion are disposed such that the sensor module rests between the first portion and the second portion.

In an alternative embodiment, the sensor housing comprises a top side, a bottom side, a left side, a right side, where the right side is configured with a light window which extends from the top side to the bottom side, a front face, a rear face, a means of fastening the sensor housing to the elevator call button system, a sensor cavity integral to the sensor housing, the sensor cavity sized to receive the sensor module within the sensor housing.

In a further embodiment, the sensor module is a first sensor module, the first sensor module having a first plurality of sensors, the first plurality of sensors configured to outwardly emit a first plurality of infrared beams, the device further comprising a second sensor module, the second sensor module having a second plurality of sensors, the second plurality of sensors configured to outwardly emit a second plurality of infrared beams, the second sensor module is in electronic communication with the sensor control system and the elevator call button system, where the first plurality of infrared beams is non-parallel to the second plurality of infrared beam.

In a highly preferred embodiment the relay board is in electronic communication with the existing elevator control system via a parallel circuit configuration so that the existing elevator call button system's functionality is unaffected by the installation of the system in accordance with the present disclosure. Further, it is preferred that the sensor control system is in electronic communication with the relay board via a serial circuit configuration.

Note that when a user places their fingers at one of the variable indexing points, the system will register which variable indexing point was selected and will transmit a corresponding signal to the existing elevator control system to simulate said button being selected. In a preferred embodiment, the system will notify a user that their selection was successful. This can be achieved through a speaker playing a voice confirmation or other noise, the corresponding call button being lit up, or some combination thereof.

The present disclosure also provides for a touchless elevator interface device, located adjacent to and for use with an elevator call button system, the elevator call button system having a plurality of call buttons, the device comprising, an elevator call button display comprising a plurality of selection points, where each of the plurality of selection points corresponds to one of the plurality of call buttons. The touchless elevator interface device, located adjacent to the elevator call button system, also comprises a sensor module comprising a plurality of sensors, each sensor comprising, an emitter configured to outwardly emit an infrared beam, a receiver, an application-specific integrated circuit chip, where the application-specific integrated circuit chip is configured to receive an input from the receiver to create a variable indexing point, and where the variable indexing point is determined by an interruption in the infrared beam.

The touchless elevator interface device, located adjacent to the elevator call button system, also comprises a sensor control system comprising a power supply and a control board, the control board having a memory and a processor, where the memory contains a plurality of computer-readable instructions containing the plurality of call buttons, the plurality of selection points, a mapping scheme correlating each of the plurality of selection points to one of the plurality of call buttons, a mapping scheme correlating each of the plurality of call buttons to one or more of the sensors, and an indexing point reference table having a means for correlating a given variable index point with the mapping scheme, where the processor is configured to execute the plurality of computer-readable instructions, where the sensor control system is in electronic communication with the sensor module, and a sensor housing envelopes the sensor module, where the touchless elevator interface device is in electronic communication with the elevator call button system.

Like the touchless elevator interface device that mounts over the preexisting elevator call buttons, the touchless elevator interface device located adjacent to the elevator call button system, in preferred embodiments, emits an audible confirmation of a user's selection, in the form of a vocal confirmation or other noises. Preferably, the touchless elevator interface device located adjacent to the elevator call button system also comprises at least one status light configured to be in communication with the sensor control system and the elevator call button system. The at least one status light provides confirmation to the user based on their selection.

The present disclosure also provides for a method for selecting a call button of an elevator call button system without touching the call button, through use of touchless elevator interface device having a sensor module comprising a plurality of sensors, each sensor having an emitter configured to outwardly emit an infrared beam, a receiver, an application-specific integrated circuit chip, where the application-specific integrated circuit chip is configured to receive an input from the receiver to create a variable indexing point. There, the variable indexing point is determined by an interruption in the infrared beam, a sensor control system comprising a power supply and a control board, the control board having a memory and a processor, where the memory contains a plurality of computer-readable instructions containing the plurality of call buttons, a mapping scheme correlating each of the plurality of call buttons to one or more of the sensors, and an indexing point reference table having a means for correlating a given variable index point with the mapping scheme. The processor is configured to execute the plurality of computer-readable instructions, where the sensor control system is in electronic communication with the sensor module, and a sensor housing which envelopes the sensor module. This is used to perform a method in accordance with the present disclosure, which starts with emitting the infrared beam outwardly from the emitter; placing, by a human user, proximate to but not in direct contact with one of the plurality of call buttons. The method then proceeds to the step of interrupting the infrared beam by the user's finger to create a variable indexing point; defining a distance equal to the distance between the variable indexing point and the emitter; detecting the interruption of the infrared beam via the receiver; determining, by the control board, which of the plurality of sensors had its respective infrared beam interrupted; determining, by the control board utilizing the indexing point reference table, the mapping scheme, and the distance, the call button; electronically communicating the desired call button to the elevator call button system; and confirming a selection of the desired call button by notifying the user.

In a preferable embodiment, note that the step of confirming a selection of the desired call button by the user, is performed by an integrated speaker, which is in electronic communication with the touchless elevator interface device. In another preferable embodiment, note that the step of confirming a selection of the desired call button by the user, is performed by a status light integrated and in electronic communication with the touchless elevator interface device.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

BRIEF DESCRIPTION OF THE PREFERRED EMBODIMENTS

In the drawings, like elements are depicted by like reference numerals. The drawings are briefly described as follows.

Figure 1:
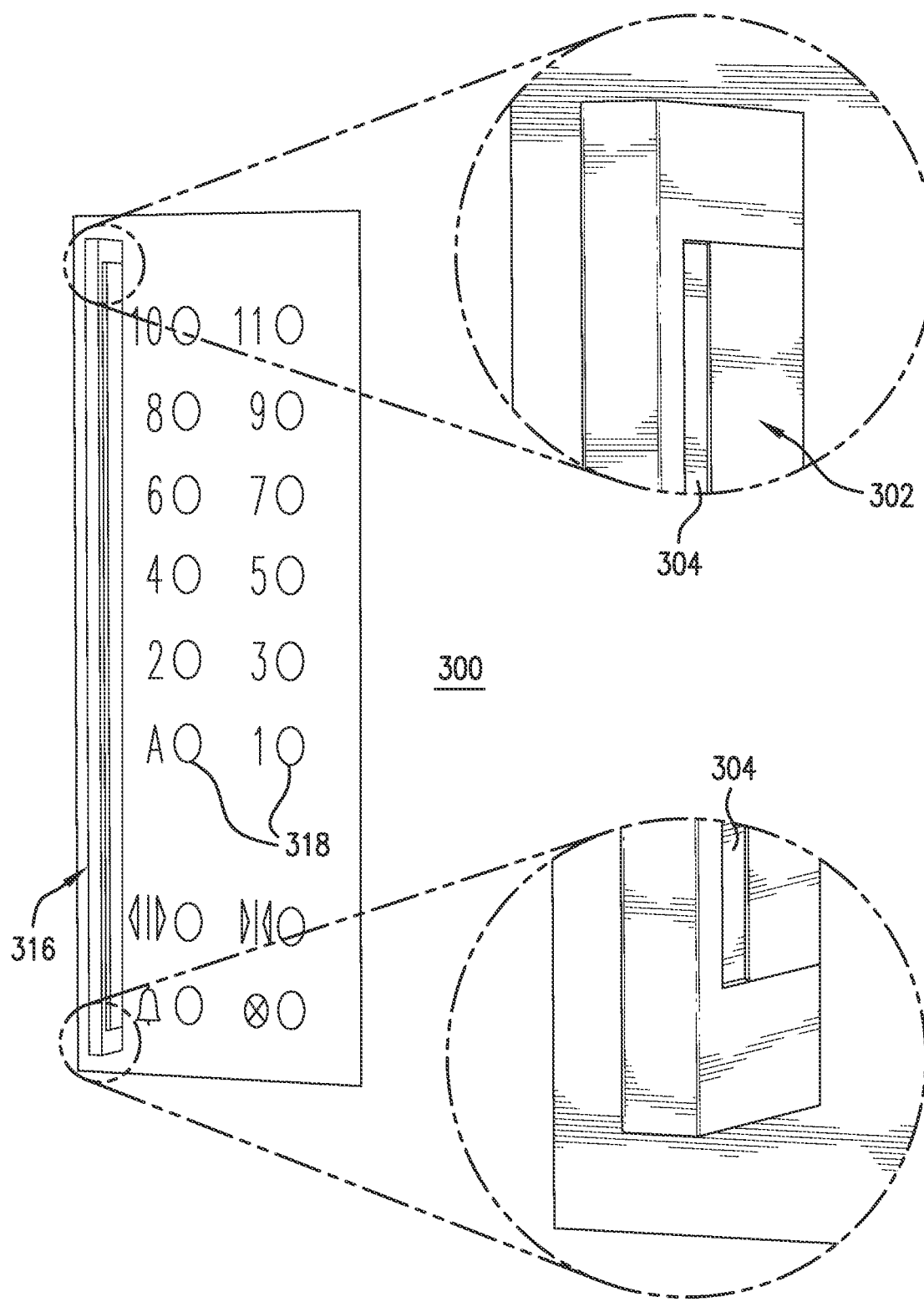
FIG. 1 is a front perspective view, showing an example embodiment of the touchless elevator call system according to the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Exhibited below are several solutions for solving the problem of selecting elevator call buttons without physical interaction with the elevator call buttons.

Referring to FIG. 1, an embodiment of the frame of the touchless elevator call button system. Here, the frame is designed to attach to the base and surround the existing elevator call button panel.

Referring to FIG. 1, an embodiment of the touchless elevator interface device 300. Here, the system includes a sensor module 302, a sensor control system 306, and a sensor housing 316. In preferred embodiments, the sensor module 302 comprises a plurality of sensors 304, each sensor 304 comprising, an emitter, a receiver, and an application-specific integrated circuit chip. Ideally, the application-specific integrated chip is configured to receive an input from the receiver to create a variable indexing point, where the variable indexing point is determined by an interruption in the infrared beam. Preferably, the sensor control system has a power supply and a control board, the control board having a memory and a processor. In some embodiments the control board is a Raspberry Pi or a similar microcomputer.

Referring to FIG. 1, preferably, the sensor housing 316 is a rectangular member mounted on the left side of a preexisting elevator call button system, such that the sensor 304 emits infrared beams across the plane of the elevator call buttons 318. In alternate embodiments the sensor housing 316 is located above, below, or to the right of the elevator call buttons 318. Preferably, either the sensor module 302 or the sensor housing 316 is angled slightly away from the elevator call buttons 318, such that the user's finger interrupts the infrared beam 1.5 to 2 inches above the elevator call buttons 318. Alternatively, neither the sensor module 302 nor the sensor housing 316 is angled away from the elevator call buttons 318.

Referring to FIG. 1, preferably, the sensor housing 316 is mounted to the elevator panel using screws. In this embodiment, screw inserts are placed into the elevator panel and the sensor housing 316 is fastened to the panel with screw. In alternate embodiments, the sensor housing 316 is fastened to the elevator panel with adhesive. In embodiments where the touchless elevator interface device 300 is being used in conjunction with elevator call buttons in an elevator bank, the sensor housing 316 is mounted adjacent to the elevator bank call buttons. In this embodiment, the sensor housing 316 is preferably screwed to the elevator bank wall. Alternatively, the sensor housing 316 may be attached to the elevator bank wall with adhesive.

Referring to FIG. 1, preferably the sensor housing 316 is made from metal, including: brass, aluminum, stainless steel, or other metals. In alternate embodiments the sensor housing 316 is made from plastic or wood.

Referring to FIG. 1, a preferable embodiment of the touchless elevator call button system 300 comprises a speaker located proximately to the elevator call button system. In some embodiments the speaker is a passive speaker, thus not requiring a power supply. In other embodiments the speaker is an active speaker, thus requiring a power supply. In that embodiment, the speaker draws from the power supply 308 of the touchless call button system 300 or an independent power supply. In a preferable embodiment, the speaker provides audible confirmation of a floor selection by emitting a noise. In further embodiments, the touchless elevator call button system 300 confirms a user's selection by emitting a vocal rendering of the button that was selected. In alternate embodiments, the speaker provides a secondary noise in conjunction with a vocal rendering. The secondary noise may be a "click," a chime, a tone, or other similar noises.

Referring to FIG. 1, a preferred embodiment of the touchless elevator call button system 300 comprises at least one status light located proximately to the elevator call button system. In this preferable embodiment, the status light emits light when a user selects an elevator call button 316. Preferably, the status light is an LED, but can also be an incandescent, fluorescent, or halogen light. In one embodiment the status light remains dark and only illuminates when a selection is made. In another embodiment, the status light is constantly lit, but emits a different color when a selection is made. Preferably, the touchless elevator call button system 300 is lit by additional lights which provide adequate light to a user attempting to make a selection. In further embodiments, the touchless elevator call button system 300 is fitted with an ultraviolet light sanitizer. In other embodiments, the elevator call buttons 316 are fitted with lights such that the elevator call buttons 316 themselves are independently lit. In such an embodiment, the light integrated into the elevator call button 316 acts as a status indicator light, changing colors or illuminating when a selection is made.

Figure 2:
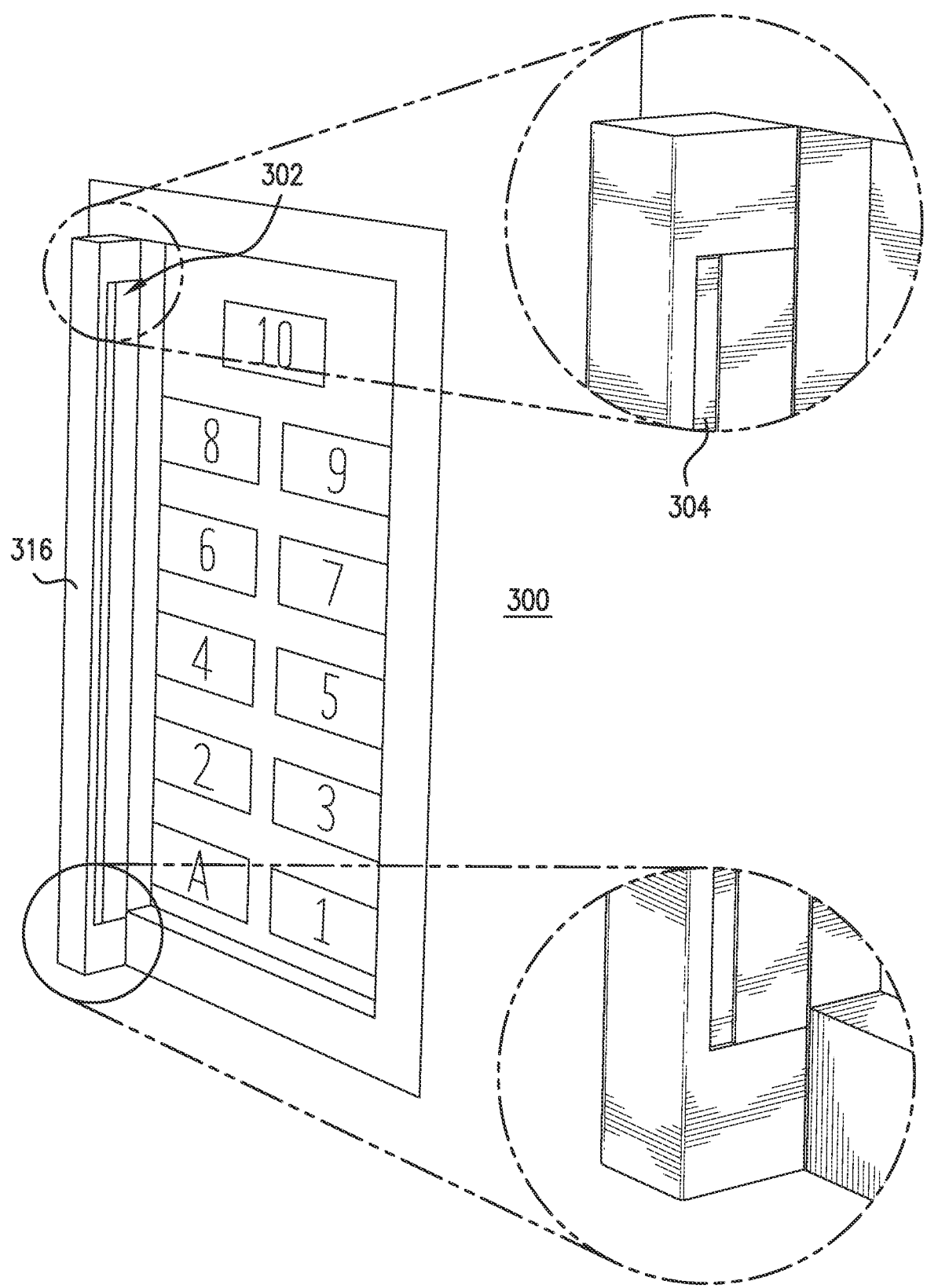
FIG. 2 is a right perspective view, showing an example embodiment of the touchless elevator call system according to the present disclosure.
Figure 3:
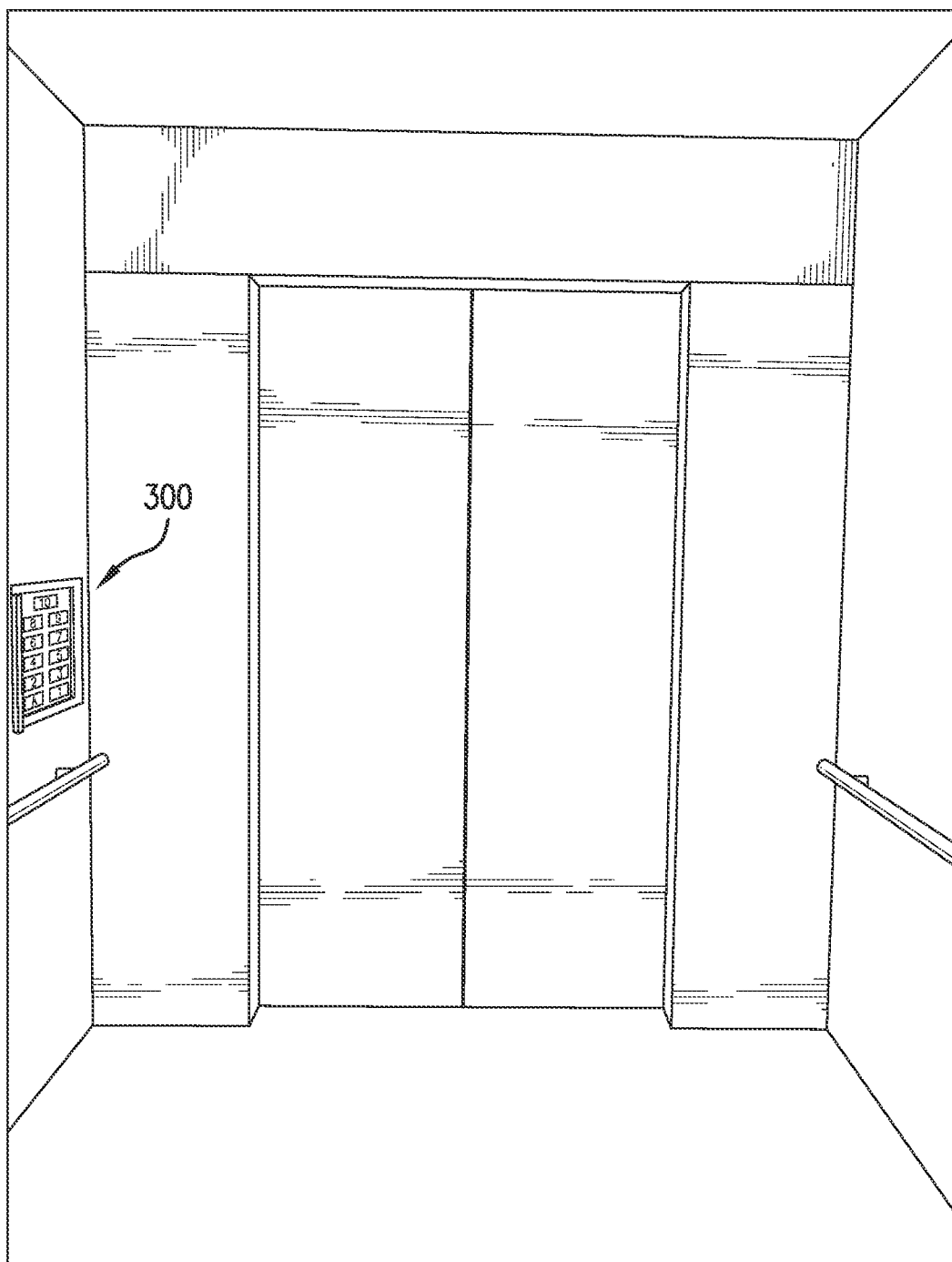
FIG. 3 is a perspective view, showing an example embodiment of the sensor module according to the present disclosure, installed for use in an elevator.
Figure 4:
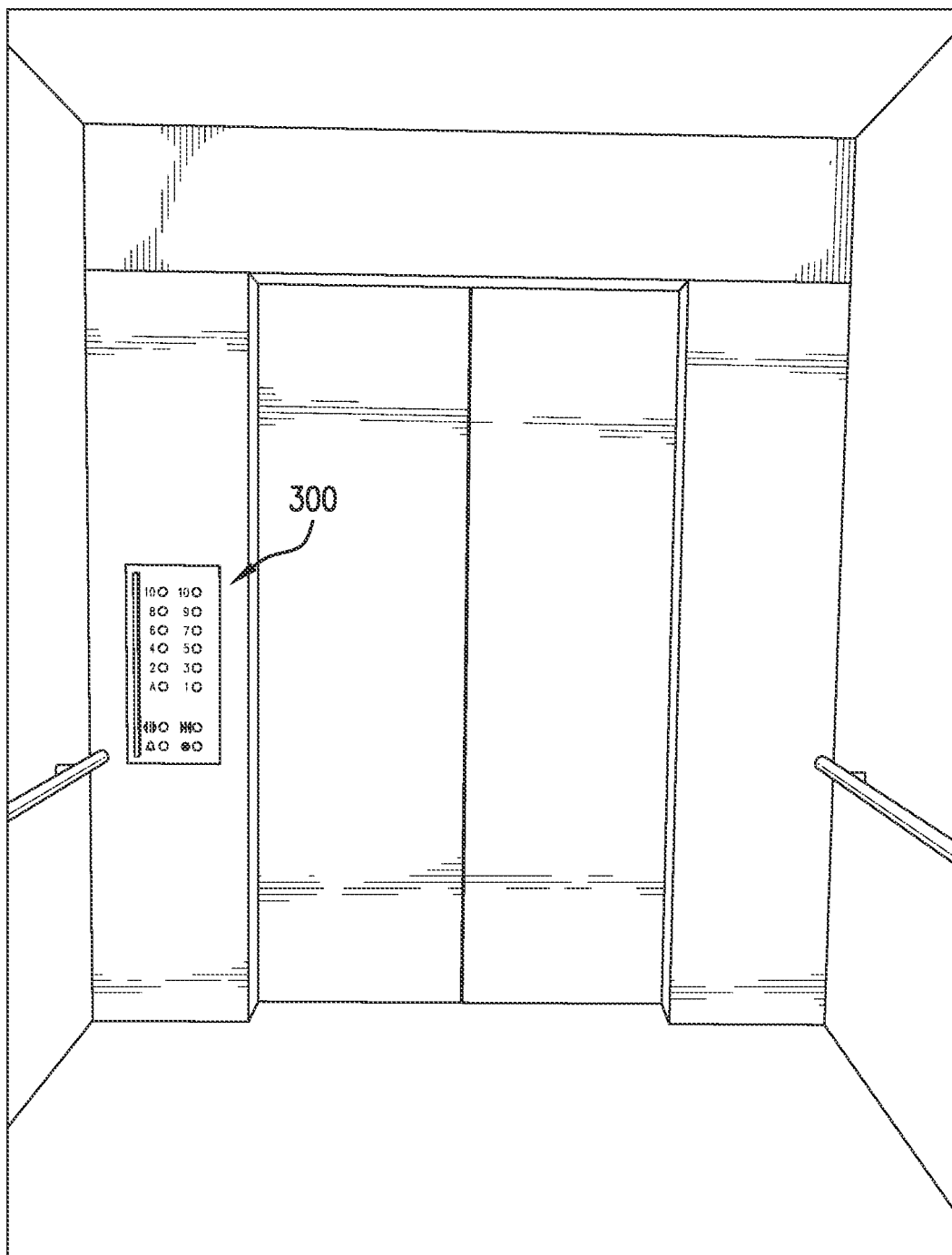
FIG. 4 is a perspective view, showing a second embodiment of the sensor module according to the present disclosure, installed for use with an existing elevator control panel.

Referring to FIG. 2, an embodiment of the touchless elevator call button system 400. Here, the system includes an elevator call button display 302, a plurality of selection points 304, a sensor module, a sensor control system, and a sensor housing 316. In this embodiment, the touchless elevator call button system 300 is located adjacent to the preexisting elevator call button system. In preferable embodiments the elevator call button display has a plurality of selection points, where each of the plurality of selection points corresponds to one of the plurality of call buttons 318 (See FIG. 1). For example, a "ground floor" selection point on the elevator call button display will correspond to the "ground floor" call button on the preexisting elevator call button system.

However, it is not required that the label on the selection point and the label on the corresponding preexisting call button 318 be identical. Instead, in some embodiments, it is preferable to label the selection point differently than the label of the preexisting elevator call button 318. For example, to reduce the footprint of the elevator call button display, it may be advantageous to correlate a selection point labeled "1" to the elevator call button labeled "first floor." In some embodiments, the selection point may correlate to more than one of the preexisting call buttons. For example, in some embodiments, there is one selection point labeled "emergency," that correlates to both the elevator call buttons labeled "emergency alarm" and "emergency stop."

As shown in FIG. 2, preferably, the selection point is labeled by etching a description of the selection point into the elevator call button display. Alternatively, the selection point is labeled using a sticker, ink, paint, a series of LEDs, laser etching, a placard, or other means of labeling. In further embodiments, the selection points may be labeled with symbols or graphical representations, in addition to or in conjunction with text labels. For example, a selection point that correlates to an "emergency alarm" preexisting elevator call button could be labeled with a graphical representation of a bell.

Preferably, the elevator call button display is mounted on the same wall or the wall directly adjacent to the preexisting elevator call button system. However, in some embodiments, the elevator call button display is mounted to the elevator wall opposite the preexisting elevator call button system.

Here, the system includes an elevator call button display, a plurality of selection points, a sensor module, a sensor control system, and a sensor housing. In this embodiment, the touchless elevator call button system is located on the wall of the elevator bank adjacent to the preexisting elevator call button system. In other embodiments, the touchless elevator call button system is located in the elevator bank, but the system is housed in a kiosk. Preferably, the sensor module comprises a plurality of sensors 408, each sensor comprising an emitter, a receiver, an application-specific integrated circuit chip. In preferable embodiments, the application-specific integrated circuit chip is configured to receive an input from the receiver to create a variable indexing point. The variable indexing point serves as a means of interpreting and mapping the user's desired selection. In most embodiments, the variable indexing point is determined by an interruption in the infrared beam.

Preferably, the sensor control system has a power supply and a control board, the control board having a memory and a processor. In preferable embodiments, the control board is a Raspberry Pi, a single-board computer, or other microcomputer. However, in some embodiments, the sensor control system is directly connected to the preexisting elevator call button system, thus not requiring an independent control board. Similarly, although it is preferable to have an independent power supply for the control board, in some embodiments the control board receives power directly from the preexisting elevator call button system.

In a preferred embodiment, the touchless elevator call button system comprises a speaker located proximately to the elevator call button system. In some embodiments the speaker is a passive speaker, thus not requiring a power supply. In other embodiments the speaker is an active speaker, thus requiring a power supply. In that embodiment, the speaker draws from the power supply of the touchless call button system or an independent power supply. In a preferable embodiment, the speaker provides audible confirmation of a floor selection by emitting a noise. In further embodiments, the touchless elevator call button system confirms a user's selection by emitting a vocal rendering of the button that was selected. In alternate embodiments, the speaker provides a secondary noise in conjunction with a vocal rendering. The secondary noise may be a "click," a chime, a tone, or other similar noises.

In some embodiments, the system in accordance with the present disclosure comprises at least one status light located proximately to the elevator call button display. In this preferable embodiment, the status light emits light when a user selects a selection point. Preferably, the status light is an LED, but can also be an incandescent, fluorescent, or halogen light. In one embodiment the status light remains dark and only illuminates when a selection is made. In another embodiment, the status light is constantly lit, but emits a different color when a selection is made. Preferably, the elevator call button display is lit by additional lights which provide adequate light to a user attempting to make a selection. In further embodiments, the elevator call button display is fitted with an ultraviolet light sanitizer.

In an alternate embodiment the touchless elevator interface device comprises more than one sensor module. In one embodiment, a first sensor module is affixed along the y-axis and a second sensor module is affixed along the x-axis. In this embodiment, both sensor modules are positioned such that the infrared beams are in the direction of the elevator call buttons.

In further embodiments multiple sensor modules are affixed to multiple elevator call button panels. For example, in situations where sets of elevator call buttons are distant from each other, it is advantageous to utilize multiple sensor modules. In such an embodiment, each sensor module will be coupled with a sensor control system. In alternative embodiments, each sensor module will be coupled to one sensor control system.

Preferably, the memory contains a plurality of computer-readable instructions containing the plurality of call buttons, a mapping scheme correlating each of the plurality of call buttons to one or more of the sensors, and an indexing point reference table having a means for correlating a given variable index point with the mapping scheme. Preferably, the memory contains the mapping scheme in the form of a table, spreadsheet, string, or other data structure where a particular variable indexing point corresponds to a particular variable elevator call button. In embodiments where the touchless elevator interface device is located adjacent to the elevator call button system and comprises an elevator call button display, there is a mapping scheme that correlates a selection point to an elevator call button. This embodiment also utilizes a mapping scheme in the form of a table, spreadsheet, string, or other data structure where a selection point corresponds to an elevator call button.

In preferable embodiments, the elevator call buttons are operational in conjunction with the touchless elevator interface device. In other words, although it is advisable for a user to use the touchless elevator interface device as a primary means of operating the elevator, the physical elevator call buttons will continue to be operational. In alternate embodiments, the physical elevator call buttons are disabled so that only the touchless elevator interface device is operational.

Preferably, the sensor control system is in electronic communication with the sensor module via a wired connection. However, there are other embodiments where the sensor control system is in wireless electronic communication with the sensor module. Also, preferably, the sensor control system is in electronic communication with the elevator call button system via a wired connection. However, there are other embodiments where the sensor control system is in wireless electronic communication with the elevator call button system.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the disclosure refers to exemplary embodiments, it will be understood by those skilled in the art that various changes may be made and equivalents may be substituted for elements thereof without departing from the scope of the disclosure. In addition, many modifications will be appreciated by those skilled in the art to adapt a particular instrument, situation or material to the teachings of the disclosure without departing from the spirit thereof Therefore, it is intended that the disclosure not be limited to the particular embodiments disclosed.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is presented a touchless elevator interface device, its method of use, and method of installation. The disclosure is illustrated by example in the drawing figures, and throughout the written description. It should be understood that numerous variations are possible while adhering to the inventive concept. Such variations are contemplated as being a part of the present disclosure.

What is claimed is:

1. A touchless elevator interface device, for use with an elevator call button system, the elevator call button system having a plurality of call buttons, the device comprising:
   a sensor module comprising a plurality of sensors and at least one application-specific integrated circuit chip, each sensor having;
      an emitter configured to outwardly emit at least one infrared beam; and a receiver,
         wherein each of the plurality of sensors are proximate to at least one of the other plurality of sensors,
         wherein the plurality of sensors are disposed in the sensor module in a linear manner creating a line in a first direction,
         wherein a variable indexing point is determined by an interruption in any of the at least one infrared beams,
         wherein the at least one infrared beam of each emitter is outwardly emitted in a second direction,
         wherein the first direction and the second direction are non-parallel, and
         wherein the plurality of sensors are in electronic communication;
   a sensor control system comprising a power supply and a control board, the control board having a first memory and a first processor,
      wherein the first memory is configured to receive and store an electronic list of the plurality of calls buttons, a location of each of the plurality of call buttons in relation to other of the plurality of call buttons,
      wherein the first memory contains computer-readable instructions for implementing a mapping scheme correlating each of the plurality of call buttons to a variable indexing point of one of the plurality of sensors, and computer-readable instructions containing an indexing point reference table having a means for correlating a given variable index point with the mapping scheme,
      wherein the first processor is configured to execute the contents of the first memory;
   a relay board having a plurality of relays, a second memory, and a second processor,
      wherein each of the plurality of relays is configured to correspond to one of the plurality of call buttons and is configured to electronically activate said corresponding call button,
      wherein the second processor is configured to execute the contents of the second memory,
      wherein the relay board, sensor control system, the sensor module, and the elevator call button system are all in electronic communication therewith; and
   a sensor housing which envelopes the sensor module,
      wherein the sensor control system and the relay board are external to the sensor module.

2. The device of claim 1, the sensor housing comprising:
   a first portion having a first top side, first bottom side, a first left side, a first right side, a first front face, a first rear face;
      wherein the first rear face is fitted with a fastening mechanism,
      wherein the first portion is configured to be fastened proximate to the elevator call button system by the fastening mechanism; and
   a second portion having a second top side, a second bottom side, a second left side, a second right side, a second front face, a second rear face;
      wherein the second rear face is attached to the first front face, and
      wherein the first portion and the second portion are disposed such that the sensor module rests in between the first portion and the second portion such that the plurality of emitters will outwardly emit light through a gap created between the first portion and the second portion.

3. The device of claim 1, further comprising an amplifier and a speaker, located proximately to the elevator call button system, the speaker is in electronic communication with the sensor control system and the elevator call button system, wherein the speaker is configured to emit noise.

4. The device of claim 3, wherein each of the plurality of call buttons is illuminated when activated by the corresponding relay.

5. The device of claim 4, the sensor housing comprising:
   a top side, a bottom side, a left side, a right side;
      wherein the right side is configured with a light window which extends from the top side to the bottom side;
   a front face, a rear face, a means of fastening the sensor housing to the elevator call button system, a sensor cavity integral to the sensor housing, the sensor cavity sized to receive the sensor module within the sensor housing.

6. The device of claim 5, further comprising at least one status light located proximately to the elevator call button system, the at least one status light being in electronic communication with the sensor control system and the elevator call button system.

7. The device of claim 6, wherein the relay board is in electronic communication with the existing elevator control system via a parallel circuit configuration.

8. The device of claim 7, wherein the sensor control system is in electronic communication with the relay board via a serial circuit configuration.

9. A method for selecting a call button of an elevator call button system without touching the call button, through use of touchless elevator interface device a sensor module comprising a plurality of sensors and at least one application-specific integrated circuit chip, each sensor having an emitter configured to outwardly emit at least one infrared beam, and a receiver, where each of the plurality of sensors are proximate to at least one of the other plurality of sensors, where the plurality of sensors are disposed in the sensor module in a linear manner creating a line in a first direction, where the variable indexing point is determined by an interruption in any of the at least one infrared beams, where the at least one infrared beam of each emitter is outwardly emitted in a second direction, where the first direction and the second direction are non-parallel, and where the plurality of sensors are in electronic communication, a sensor control system comprising a power supply and a control board, the control board having a first memory and a first processor, where the first memory is configured to receive and store an electronic list of the plurality of calls buttons, a location of each of the plurality of call buttons in relation to other of the plurality of call buttons, where the first memory contains computer-readable instructions for implementing a mapping scheme correlating each of the plurality of call buttons to a variable indexing point of one of the plurality of sensors, and computer-readable instructions containing an indexing point reference table having a means for correlating a given variable index point with the mapping scheme, where the first processor is configured to execute the contents of the first memory, a relay board having a plurality of relays, a second memory, and a second processor, where each of the plurality of relays is configured to correspond to one of the plurality of call buttons and is configured to electronically activate said corresponding call button, where the second processor is configured to execute the contents of the second memory, where the relay board, sensor control system, the sensor module, and the elevator call button system are all in electronic communication therewith, the method comprising the steps of:

a. emitting the infrared beam outwardly from the plurality of emitters;

b. placing a finger, by a human user, proximate to, but not in direct contact with, one of the plurality of call buttons;

c. interrupting one infrared beam, with the finger, to create a variable indexing point;

d. defining a distance equal to the distance between the variable indexing point and the emitter;

e. detecting the interruption of the infrared beam via the receiver;

f. determining, by the control board, which of the plurality of sensors had its respective infrared beam interrupted;

g. determining, by the control board utilizing the indexing point reference table, the mapping scheme, and the distance, the call button of step b;

h. electronically activating, via the relay board, the desired call button; and i. confirming a selection of the desired call button by notifying the user.

10. The method of claim 9, wherein step i is performed by an integrated speaker integrated and in electronic communication with the touchless elevator interface device.

11. The method of claim 9, wherein step i is performed by a status light integrated and in electronic communication with the touchless elevator interface device.

12. The method of claim 9, wherein the relay board is in electronic communication with the existing elevator control system via a parallel circuit configuration.

13. The method of claim 12, wherein the sensor control system is in electronic communication with the relay board via a serial circuit configuration.

\* \* \* \* \*